United States Patent Office 3,424,759
Patented Jan. 28, 1969

3,424,759
PROCESS FOR HALOGENATING PHTHALOCYANINES
John Dewar Stewart and Alexander Hamilton, Glasgow, Scotland, assignors to J. R. Geigy A.-G., Basel, Switzerland
No Drawing. Continuation of application Ser. No. 359,513, Apr. 13, 1964. This application Sept. 7, 1967, Ser. No. 666,218
Claims priority, application Great Britain, Apr. 24, 1963, 16,074/63
U.S. Cl. 260—314.5      18 Claims
Int. Cl. C09b 47/10

ABSTRACT OF THE DISCLOSURE

This invention relates to a process for producing phthalocyanine pigments and in particular to an improved process for halogenating phthalocyanines.

---

This application is a continuation of our copending application Ser. No. 359,513, filed Apr. 13, 1964, now abandoned.

It is known that by introducing halogen atoms into the phthalocyanine molecule, the blue shade of the color can be rendered more yellow (the maximum number of halogen atoms which may be taken up by the phthalocyanine molecule is sixteen) and that the most attractive green to yellow-green shades are associated with a high degree of halogenation. The introduction of a relatively high ratio of bromine to chlorine in the phthalocyanine molecule leads to the production of bright coloring matters with high tinctorial strength, that are characterized by a desirable yellowness of shade.

Many processes have been proposed for carrying out the halogenation of phthalocyanines, whether metal-free or in the form of metal-complexes, especially copper phthalocyanines. In producing polychlorobromophthalocyanine pigments, it is known to halogenate the metal-free or complex phthalocyanine starting material in a melt of sodium chloride and anhydrous aluminum chloride, using elemental chlorine and bromine as halogenating agents. This method is cheap, but has two major disadvantages: in order to achieve a high degree of halogenation the reaction must be conducted over a long period of time, for example, 24 hours, and the crude halogenated phthalocyanine must be conditioned by prolonged and expensive techniques, for example, acid pasting, salt milling or treatment with large amounts of organic solvent.

It is also known to halogenate phthalocyanines by heat treatment with a Friedel-Crafts type compound and sulfur trioxide or a compound of the formula R—$SO_2$-halogen, in which R represents an —OH or —O-metal group or an organic residue. In this process, the advantage of high speed is offset by the high ratio of Friedel-Crafts compound-to-phthalocyanine starting materials which ratio is necessary to provide a fluid melt.

A process for reacting a metal-free or a complex metal phthalocyanine with pyrosulfuryl chloride in a melt composed essentially of a Friedel-Crafts type compound without addition of elemental halogen and a further process for halogenating such phthalocyanines in the presence of a Friedel-Crafts type compound using sulfuryl chloride in conjunction with sulfur monochloride without the use of elemental halogen are also known.

It is an object of this invention to provide a process for the production of halogenated phthalocyanine pigments which can be dispersed very readily in paints, lacquers, inks and other media.

This object is attained in the process according to the present invention of halogenating phthalocyanine compounds which process comprises in a first step:

(a) Heating a mixture of a pthalocyanine compound and a Friedel-Crafts compound at a temperature sufficient to melt the mixture and contacting and thereby reacting the melt with elemental halogen in the absence of sulfur compounds; and, upon termination of the introduction of an amount of halogen at least equivalent to the amount stoichiometrically required to attain a predetermined degree of halogenation, in a second step, (b) Contacting the resulting mixture in the absence of elemental halogen with a sulfur oxychloride type agent defined further below, preferably at a temperature ranging from about 100° to 200° C.; and finally (c) Recovering the resulting halogenated phthalocyanine.

The term "phthalocyanine compound" as used in this specification and the appended claims signifies a metal-free phthalocyanine or a metal-complex of an unhalogenated or an already partially halogenated phthalocyanine, for instance a complex with copper or with cobalt, or a mixture of such compounds.

The term "Friedel-Crafts compound" signifies a compound which is useful as the catalyst in a Friedel-Crafts reaction, although, in the process according to the invention, the part played by this compound is not yet fully clarified.

The melt containing the phthalocyanine compound and the Friedel-Crafts compound may, if desired, also contain a conventional melting point depressant, for example, sodium chloride or other alkali metal halide. The melt may be prepared for instance, by heating together a mixture of the phthalocyanine compound with the Friedel-Crafts compound, if desired in admixture with a melting point depressant, to a temperature at which the mixture is fluid. Alternatively, the Friedel-Crafts compound, if desired, jointly with a melting point depressant, e.g., an inorganic salt such as sodium chloride, may be first heated to a temperature being at least that of the melting point, and the phthalocyanine compound may then be added to the resulting melt. Examples of Friedel-Crafts compounds usable in the process of the invention are aluminum chloride, aluminum bromide, ferric chloride, zinc chloride and antimony trichloride.

The term "elemental halogen" as used in this specification and the appended claims signifies chlorine, bromine or a mixture of chlorine and bromine. When both chlorine and bromine are used in the first step of the process according to the invention, to wit the halogenation stage, the melt is preferably first contacted with halogen by adding the bromine and then, when addition of the bromine to the melt is completed, contacting the reaction mixture with the chlorine. The melt containing the Friedel-Crafts compound and the phthalocyanine compound is preferably reacted with the elemental halogen while being maintained at a temperature within the range of from 80° to 250° C., a temperature within the range of from 110° to 220° C. being particularly preferred. The time of reaction, which is conveniently that during which the halogen is added to or otherwise contacted with the melt, varies over a wide range, and depends largely on the nature and on the method of introduction of the elemental halogen; when bromine is used as the elemental halogen, the reaction time is, in general, within the range of from 30 minutes to about 12 hours and preferably not more than 3 hours; in many cases the halogenation phase is completed within six hours, however, when chlorine or both chlorine and bromine are used as the elemental halogen, it is usually desirable to extend the addition of the halogen to the melt over a longer period, e.g. up to about 20 hours, and preferably not more than 10 hours.

In the second step of the process according to the invention, the mixture resulting from the reaction of the melt containing the phthalocyanine compound and Friedel-Crafts compound, the inorganic salt, and if desired, the melting point depressant, with the elemental halogen is contacted with the above mentioned sulfur oxychloride type agent. The latter term as used in the specification and the claims signifies the following reactants: thionyl chloride, sulfuryl chloride, pyrosulfuryl chloride, a mixture of two or more of the aforesaid sulfur oxychlorides, for example, a mixture of sulfuryl chloride and pyrosulfuryl chloride; the term also signifies the combination of a sulfur chloride with the aforesaid sulfur oxychloride or sulfur oxychlorides, in particular, a mixture of sulfuryl chloride and sulfur monochloride: when a combination containing a sulfur chloride is used the latter is preferably present in a minor proportion relative to the proportion of the sulfur oxychloride.

The process phase of contacting the melt with the sulfur oxychloride is preferably effected while the mixture resulting from the reaction with the elemental halogen is maintained at a temperature within the range of from 80° to 200° C. and preferably 100° to 200° C. The time of reaction, which is again conveniently that during which the sulfur oxychloride is brought together with the product from the reaction with the elemental halogen, may vary between wide limits, but is in general conveniently within the range of from 10 minutes to 3 hours.

The amount of sulfur oxychloride or mixture of sulfur oxychlorides or the mixture of sulfur chlorides and sulfur oxychlorides with which the mixture resulting from the reaction with the elemental halogen is contacted, is preferably within the range of from 1 to 5 parts by weight and preferably 1.5 to 4 parts by weight per part by weight of the metalliferous or metal-free phthalocyanine compound. When a minor proportion of sulfur chloride, for instance sulfur monochloride, is added in addition to the sulfur oxychloride or mixture of sulfur oxychlorides, the amount of the sulfur chloride used is preferably within the range of from 0.1 to 0.5 part by weight per part by weight of the phthalocyanine compound.

At the end of the second process step, the reaction product is advantageously maintained at an elevated temperature for a further period. Preferably this temperature is also within the range of from 100° to 200° C. and the time for which the reaction product is thus heated is preferably also within the range of from a few minutes up to 4 hours.

The reaction product is advantageously further treated by means conventional in the art of pigment production. For instance, the reaction product is poured into a large excess of cold water, if desired acidified with hydrochloric acid, and the resulting pigment is then separated by filtration, washed and dried.

By the process of the invention, halogenated phthalocyanine pigments can be produced, for example, chlorobromophthalocyanine pigments, which contain at least twelve and under preferred conditions at least thirteen halogen atoms in the molecule.

The pigments produced in accordance with the present invention are, in general, already very well dispersible in organic media but, if desired, the pigment produced may be subjcted to an after-treatment to improve its dispersibility and other pigmenting properties further. This after-treatment may be a conventional technique, for example, boiling a dispersion of the pigment in nitro-benzene or other organic solvent under reflux conditions in the presence of sodium hydroxide or another alkali and oleic acid or other long-chain fatty acid; the slurry thus obtained is freed from solvent by evaporation of the latter, filtered, washed and dried to produce a refined phthalocyanine pigment having excellent dispersibility in paint, ink, plastic synthetic resins and other organic media, without requiring expensive processing such as acid-pasting as has previously been commonly employed.

The following nonlimitative examples further illusrtate the present invention; therein all parts and percentages given are expressed by weight and all temperatures are given in degrees centigrade. In all of the examples, the reactions were carried out in a vessel equipped with thermometer, agitator and reflux condenser.

Example 1

52.5 parts of anhydrous aluminum chloride, 7.5 parts of sodium chloride and 10 parts of copper phthalocyanine were added to a reaction vessel and the mixture was heated to 110°, at which temperature it was fluid. 22.5 parts of elemental bromine were then added at 110° over a period of 75 minutes, 25 parts of pyrosulfuryl chloride were added directly subsequently over a period of 30 minutes. The mixture was then stirred at 160° for 30 minutes and afterwards poured into 500 parts of water of ambient temperature (20°), and containing 4.5 parts of concentrated hydrochloric acid.

The crude pigment, after separation by filtration, washing and drying, contained 9.7% chlorine and 54.6% bromine. It was readily dispersible in many organic media without an after-treatment. By heating 10 parts of this product in the form of a filter cake containing 20% dry weight of phthalocyanine green under reflux for 3 hours with a mixture of 10 parts of nitrobenzene, 0.6 part of sodium hydroxide and 0.3 part of oleic acid, ultimately eliminating the nitrobenzene by steam distillation, followed by filtration, washing and drying, a refined phthalocyanine green pigment was obtained which exhibited outstandingly good dispersibility when incorporated in paint, ink and synthetic plastic media.

Example 2

52.5 parts of anhydrous aluminum chloride, 7.5 parts of sodium chloride and 10 parts of copper phthalocyanine were added to a reaction vessel and the mixture was heated to 220° at which temperature it was fluid. 22.5 parts of bromine were then added over a period of 75 minutes, the temperature was dropped to 150° and 25 parts of pyrosulfuryl chloride were added over 30 minutes. The temperature of the mixture was finally raised to 160° for 30 minutes.

After separation, washing and drying, a brilliant yellow-green phthalocyanine pigment containing 10.8% chlorine and 55.6% bromine was obtained, the dispersibility of which was at least equal to that obtained according to the preceding example.

Similar results are obtained when using, in the above Example 2, in lieu of anhydrous aluminum chloride an equimolar amount of aluminum bromide.

Example 3

49 parts of anhydrous aluminum chloride and 9 parts of sodium chloride were heated to 150° to obtain a fluid melt. 10 parts of copper phthalocyanine were added during 10 minutes and the mixture was stirred for 30 minutes. With the temperature maintained at 150°, 9 parts of elemental bromine were added during 45 minutes, followed by 35.5 parts of pyrosulfuryl chloride which were added during 1 hour after the addition of bromine had terminated.

After processing and conditioning the reaction product by the procedure described in Example 1, there was obtained a brilliant yellow-green phthalocyanine pigment of high dispersibility, containing 22.0% chlorine and 35.1% bromine.

Example 4

50 parts of anhydrous aluminum chloride, 8 parts of sodium chloride and 11 parts of monochloro copper phthalocyanine were heated to melting in a reaction vessel and the temperature of the melt was raised to 160°, at which temperature 27.5 parts of elemental bromine were added during 90 minutes. The temperature was lowered to 140° and 27 parts of pyrosulfuryl chloride were then added during 30 minutes, the temperature being held at 140° for a further 60 minutes. On processing and conditioning the crude product by the procedure described in Example 1, there was obtained a brilliant yellow-green pigment containing 8.2% chlorine and 55.1% bromine.

When replacing the monochloro copper phthalocyanine by 8.8 parts of cobalt phthalocyanine, the green pigment ultimately obtained contained 3.8% chlorine and 61.0% bromine.

When 8 parts of metal-free phthalocyanine were used as starting material, the yellow-green pigment ultimately obtained contained 5.3% chlorine and 59.4% bromine.

Example 5

50 parts of anhydrous aluminum chloride, 8 parts of sodium chloride and 10 parts of copper phthalocyanine were heated together in a reaction vessel to 150°, at which temperature there was added to the fluid melt during 2 hours 30 parts of elemental bromine, followed by 30 parts of thionyl chloride added during 15 minutes at the same temperature.

The mixture was held at 150° for a further 2 hours and then processed and conditioned by the procedure described in Example 1, to yield a brilliant yellow-green pigment containing 1.6% chlorine and 63.4% bromine.

Example 6

50 parts of anhydrous aluminum chloride, 4 parts of sodium chloride and 10 parts of copper phthalocyanine were heated together in a reaction vessel to 160° at which temperature 24 parts of elemental bromine were added to the fluid melt during 90 minutes.

The mixture was then cooled to 110° and during 90 minutes, a mixture of 27.5 parts of sulfuryl chloride and 2 parts of sulfur monochloride was added thereto at this temperature. The reaction mixture was then heated to 145° and held at this temperature for 1 hour. After processing and conditioning the product as in Example 1, there was obtained a brilliant yellow-green pigment containing 11.8% chlorine and 53.6% bromine.

Example 7

The procedure described in Example 6 was carried out, except that the sulfur oxyhalide/halide mixture used consisted of 22.5 parts of sulfuryl chloride and 2 parts of sulfur monochloride.

The brilliant yellow-green pigment obtained contained 6.2% chlorine and 59.5% bromine.

Example 8

The procedure described in Example 6 was carried out except that the temperature of the melt was raised to 210°, at which temperature the elemental bromine was added.

The brilliant yellow-green pigment obtained contained 6.9% chlorine and 57.7% bromine.

Example 9

50 parts of anhydrous aluminum chloride, 8 parts of sodium chloride and 11 parts of monochloro copper phthalocyanine were heated together in a reaction vessel to 160°, at which temperature there was added to the fluid melt 23 parts of elemental bromine during 1 hour. The temperature was then lowered to 120° and a mixture of 27 parts of sulfuryl chloride and 2 parts of sulfur monochloride was added during 90 minutes. After raising the temperature of the reaction mixture to 150° and maintaining it thereat for 45 minutes, the mixture was poured into cold water and processed and conditioned as in Example 1.

The brilliant yellow-green pigment obtained contained 8.7% chlorine and 54.2% bromine.

By replacing the monochloro copper phthalocyanine by 8.8 parts of cobalt phthalocyanine, a green pigment was obtained which contained 7.3% chlorine and 54.6% bromine.

When using as starting material 8.0 parts of metal-free phthalocyanine, the final product contained 10.6% chlorine and 51% bromine.

Example 10

50 parts of anhydrous aluminum chloride, 8 parts of sodium chloride and 10 parts of copper phthalocyanine were heated together in a reaction vessel to 200°. To the fluid melt there were added at this temperature during 4 hours, 25 parts of chlorine. A sample withdrawn from the reaction zone and poured into an excess of cold water showed, on analysis, after separating, washing and drying, a chlorine content of 33%. The temperature of the melt was then lowered to 160°, whereupon 31.5 parts of pyrosulfuryl chloride were added during 30 minutes. After stirring for a further 90 minutes at 160°, the melt was poured into 500 parts of water containing 4.5 parts of concentrated hydrochloric acid at ambient temperature.

The crude pigment, after separation by filtration, washing and drying, contained 47% chlorine and was readily dispersible in many organic media without after-treatment.

The advantages to be gained by using a process in accordance with the present invention are clearly brought out in the following comparative test, in which the phase of subsequent partial chlorination by means of a sulfur oxychloride was omitted.

41 parts of anhydrous aluminum chloride, 8.8 parts of sodium chloride and 10 parts of copper phthalocyanine were heated to 160° to obtain a fluid melt. The temperature of the reaction mixture was then lowered to 150° and 37.3 parts of dry gaseous chlorine were introduced over a period of 17 hours. The melt was then drowned out by the procedure described in Example 10 and the resultant pigment was found to contain 47.2% chlorine. The crude product from this comparative procedure, however, had only low pigmentary value and required lengthly and expensive conditioning techniques, for example, acid pasting, to render it suitable for application as a pigment. It will be noted that the process of our invention, as illustrated by Example 10, requires a much shorter reaction time than is required in this comparative procedure which is far more time-consuming. Moreover, unlike the crude phthalocyanine green prepared according to the process of the present invention, the crude product obtained by the comparative procedure has no pigmentary value and even the final preparatory steps described in Example 10 yielded only a green phthalocyanine pigment of markedly inferior color strength compared with that prepared by the process of this invention.

Example 11

50 parts of anhydrous aluminum chloride, 8 parts of sodium chloride and 10 parts of copper phthalocyanine were heated together in a reaction vessel to 160°. To the fluid mixture thus obtained, there was added, at this temperature, 13.5 parts of liquid bromine followed by 10 parts of dry gaseous chlorine. The temperature of the mixture was then lowered to 140° and 15 parts pyrosulfuryl chloride were added during 30 minutes. After stirring for 2 hours at 140°, the mixture was processed and conditioned as described in Example 1.

The brilliant yellow-green phthalocyanine pigment thus obtained contained 14.6% chlorine and 45.3% bromine.

Example 12

75 parts of ferric chloride, 8 parts of sodium chloride and 10 parts of copper phthalocyanine were heated in a reactor to 200° to form a melt. While maintaining the reactor contents at 200°, 27.5 parts of bromine were added over 2 hours; the temperature was then lowered to 120° and a mixture of 25 parts of sulfuryl chloride and 5 parts of pyrosulfuryl chloride was added over 1 hour. The temperature of the mixture was then raised to 160° and the mixture was stirred for 1 hour at this temperature.

After pouring the reaction product into acidified water, and recovering and conditioning the resulting pigment by the procedure described in Example 1, a green phthalocyanine pigment was obtained containing 28.6% chlorine and 15.9% bromine.

Similar results are obtained by repeating the above example, but using in lieu of ferric chloride an equimolar amount of antimony trichloride.

Example 13

50 parts of aluminum chloride, 8 parts of sodium chloride and 10 parts of copper phthalocyanine were heated in a reactor to 180° to form a fluid melt. While maintaining the reactor contents at this temperature, 2.5 parts of bromine were added over 1 hour, followed by 15 parts of chlorine added over 6 hours. The temperature of the reactor contents was then decreased to 100° and 31.5 parts of sulfuryl chloride were added over 2 hours. The temperature was then raised to 160° and the mixture was stirred at this temperature for 1 hour.

After pouring the reaction product into acidified water, and recovering and conditioning the resulting pigment by the procedure described in Example 1, a brilliant yellow-green pigment was obtained containing 43.5% chlorine and 10.4% bromine.

Example 14

41.5 parts of aluminum chloride, 8 parts of sodium chloride and 10 parts of copper phthalocyanine were heated in a reactor to 180° to form a fluid melt. While maintaining the reactor contents at this temperature, 5 parts of bromine were added over 30 minutes, followed by 15 parts of chlorine added over 7 hours. The temperature of the reactor contents was then decreased to 100° and 31.5 parts of sulfuryl chloride were added over 90 minutes. The temperature was then raised to 160°, the mixture poured immediately into 500 parts of water at ambient temperature containing 4.5 parts of concentrated hydrochloric acid.

The crude pigment, after separating by filtration, washing and drying, contained 36.5% chlorine and 14.6% bromine. It was readily dispersible in many organic media without an after-treatment. By heating 10 parts of this product under reflux for 3 hours with a mixture of 10 parts of nitrobenzene, 0.6 part of sodium hydroxide and 0.3 part of oleic acid per 10 parts of pigment (in the form of a filter cake containing about 20% dry weight of phthalocyanine green), ultimately eliminating the nitrobenzene by steam distillation, followed by filtration, washing and drying, a refined phthalocyanine green pigment was obtained which exhibited outstandingly good dispersibility when incorporated in paint, ink and plastic media.

Example 15

50 parts of aluminum chloride, 8 parts of sodium chloride and 10 parts of copper phthalocyanine were heated in a reaction vessel to 160° to form a fluid melt. While maintaining the reactor contents at this temperature, 29 parts of bromine were added over 2 hours at 160° and the mixture was then stirred at this temperature for 30 minutes to allow full reaction of bromine. The melt was then cooled to 100° and 32.5 parts of sulfuryl chloride were added over 90 minutes. The temperature was raised to 120° and the melt held at this temperature for 30 minutes before being poured into 750 parts of water at 50° containing 1.5 parts of concentrated hydrochloric acid.

The crude pigment, after separation by filtration, washing and drying, was readily dispersible in conventional organic media without an after-treatment; a refined pigment of especially outstanding strength and shade was obtained by subjecting the product as filter cake to the conditioning technique described in Example 1 whereupon a very brilliant yellow-green phthalocyanine pigment was obtained containing 6.1% chlorine and 57.9% bromine.

Example 16

54.5 parts of aluminum chloride, 5.5 parts of sodium chloride and 10 parts of copper phthalocyanine were heated in a reaction vessel to 160° to form a fluid melt. While maintaining the reactor contents at 155°–160°, 4.5 parts of bromine were added over 1 hour, followed by 30 minutes stirring to allow full reaction of bromine. The melt was then cooled to 100° and there was added over 4 hours a mixture of 66.5 parts of sulfuryl chloride and 12 parts of sulfur monochloride while maintaining the temperature at 95°–100°. The mixture was then heated to 170° over 1 hour and maintained at that temperature for 3 hours before drowning into 500 parts of water at ambient temperature containing 3.5 parts of concentrated hydrochloric acid.

After conditioning by the method described in Example 1, the bright green pigment contained 39.5% chlorine and 9.3% bromine.

What is claimed is:

1. A process of halogenating a phthalocyanine compound, which comprises
    (a) heating a mixture of the phthalocyanine compound, a Friedel-Crafts compound and an inorganic salt melting point depressant for the latter, at a temperature sufficient to melt the mixture and contacting and thereby reacting the melt with elemental halogen,
    (b) subsequently adding a sulfur oxychloride type agent selected from the group consisting of sulfuryl chloride, pyrosulfuryl chloride, a mixture thereof, and a mixture of sulfuryl chloride chloride with sulfur chloride, to the resulting mixture at a temperature ranging from about 100° to 200° C., and
    (c) recovering the resulting halogenated phthalocyanine.

2. A process as claimed in claim 1 wherein the melt containing the phthalocyanine compound and the Friedel-Crafts compound also contains an alkali metal halide as melting point depressant.

3. A process as claimed in claim 2 wherein the melting point depressant of the Friedel-Crafts compound is sodium chloride.

4. A process as claimed in claim 1, wherein the melt is prepared by heating the Friedel-Crafts compound to a temperature at least that of the melting point, the phthalocyanine compound then being added.

5. A process as claimed in claim 1 wherein the Friedel-Crafts compound is a member selected from the group consisting of aluminum chloride, aluminum bromide, ferric chloride, zinc chloride and antimony trichloride.

6. A process as claimed in claim 1 wherein the elemental halogen is bromine.

7. A process as claimed in claim 1 wherein the melt is contacted with halogen by first adding bromine and then, when addition of bromine to the melt is completed, contacting the resulting reaction mixture with chlorine.

8. A process as claimed in claim 1 wherein the melt is maintained at a temperature within the range of from 80° to 250° C., while being contacted with elemental halogen.

9. A process as claimed in claim 1 wherein the elemental halogen is bromine and wherein the time during which the halogen is contacted with the melt ranges from 30 minutes to 3 hours.

10. A process as claimed in claim 1 wherein the elemental halogen is a member selected from the group consisting of chlorine and a combination of chlorine and bromine, and wherein the time during which the halogen is contacted with the melt ranges from 30 minutes to 10 hours.

11. A process as claimed in claim 1 wherein the sulfur oxychloride type agent is sulfuryl chloride.

12. A process as claimed in claim 1 wherein the sulfur oxychloride type agent consists of sulfuryl chloride with an admixture of a sulfur chloride.

13. A process as claimed in claim 12 wherein the sulfur chloride is sulfur monochloride.

14. A process as claimed in claim 1 wherein the time during which the sulfur oxychloride type agent is added to the product from the reaction with the elemental halogen ranges from 10 minutes to about 3 hours.

15. A process as claimed in claim 1 wherein the amount of the sulfur oxychloride type agent added is within the range of from 1 to 5 parts by weight per part by weight of phthalocyanine compound.

16. A process as claimed in claim 12 wherein the amount of sulfur chloride present in the sulfur oxychloride type agent is within the range of from 0.1 to 0.5 part by weight per part by weight of phthalocyanine compound.

17. A process as claimed in claim 1 wherein, after the sulfur oxychloride type agent has been added, the reaction mixture is maintained at a temperature of from about 100° to 200° C. for a further period of from 10 minutes to about 3 hours.

18. A process as claimed in claim 1, wherein the sulfur oxychloride type agent is pyrosulfuryl chloride.

References Cited

UNITED STATES PATENTS 2,873,279  2/1959  Randall et al. _____ 260—314.5

JAMES A. PATTEN, *Primary Examiner.*